US008901187B1

(12) United States Patent
Dounis et al.

(10) Patent No.: US 8,901,187 B1
(45) Date of Patent: Dec. 2, 2014

(54) HIGH RESILIENCE FLEXIBLE POLYURETHANE FOAM USING MDI

(75) Inventors: Dimitrios V. Dounis, Denver, NC (US); Dwayne Lewis Beard, Hickory, NC (US); Camden Eugene McLaughlin, Hickory, NC (US); Kimberly R. Fair, Conover, NC (US)

(73) Assignee: Hickory Springs Manufacturing Company, Hickory, NC (US)

( * ) Notice: Subject to any disclaimer, the term of this patent is extended or adjusted under 35 U.S.C. 154(b) by 98 days.

(21) Appl. No.: 12/640,210

(22) Filed: Dec. 17, 2009

Related U.S. Application Data

(60) Provisional application No. 61/203,168, filed on Dec. 19, 2008.

(51) Int. Cl.
*C08G 18/18* (2006.01)
(52) U.S. Cl.
USPC ........... 521/128; 521/129; 521/130; 521/170; 521/174
(58) Field of Classification Search
CPC ............ C08J 9/0042; C08J 9/08; C08J 9/142; C08J 2203/10; C08J 2203/12; C08J 2203/184; C08J 2205/06; C08G 2101/0008
USPC .......................... 521/170, 174, 128, 129, 130
See application file for complete search history.

(56) References Cited

U.S. PATENT DOCUMENTS

| | | | |
|---|---|---|---|
| 3,741,917 A | 6/1973 | Morehouse | |
| 4,167,612 A | 9/1979 | Tucker et al. | |
| 4,205,136 A | 5/1980 | Ohashi et al. | |
| 4,239,856 A | 12/1980 | Rowton | |
| 4,365,025 A | 12/1982 | Murch et al. | |
| 4,525,490 A | 6/1985 | Smith | |
| 4,605,684 A | 8/1986 | Pcolinsky, Jr. | |
| 4,722,942 A | 2/1988 | Nichols et al. | |
| 4,833,176 A | 5/1989 | Wolf et al. | |
| 4,845,133 A | 7/1989 | Priester, Jr. et al. | |
| 4,910,231 A | 3/1990 | Pham et al. | |
| 4,950,694 A | 8/1990 | Hager | |
| 4,994,502 A | 2/1991 | Markovs et al. | |
| 5,010,117 A | 4/1991 | Herrington et al. | |
| 5,043,360 A | 8/1991 | Pham et al. | |
| 5,104,907 A | 4/1992 | Yoshimura et al. | |
| 5,145,882 A | 9/1992 | Samaritter et al. | |
| 5,171,759 A | 12/1992 | Hager | |
| 5,175,195 A | 12/1992 | Tani et al. | |
| 5,182,314 A | 1/1993 | Tani et al. | |
| 5,194,453 A | 3/1993 | Jourquin et al. | |
| 5,236,964 A | 8/1993 | Savoca et al. | |
| 5,270,348 A | 12/1993 | Muller et al. | |
| 5,332,764 A | 7/1994 | Tairaka et al. | |
| 5,334,689 A | 8/1994 | Muller et al. | |
| 5,367,050 A | 11/1994 | Tairaka et al. | |
| 5,369,138 A | 11/1994 | Gansen | |
| 5,436,277 A | 7/1995 | Narayan et al. | |
| 5,441,993 A | 8/1995 | Maretti | |
| 5,459,170 A | 10/1995 | Bleys et al. | |
| 5,482,980 A | 1/1996 | Pcolinsky | |
| 5,491,177 A | 2/1996 | De Witte | |
| 5,500,452 A * | 3/1996 | Baker et al. .................... | 521/130 |
| 5,506,278 A | 4/1996 | Walmsley | |
| 5,521,226 A | 5/1996 | Bleys | |
| 5,530,034 A | 6/1996 | Narayan et al. | |
| 5,536,757 A | 7/1996 | Walmsley | |
| 5,538,779 A | 7/1996 | Mispreuve et al. | |
| 5,539,011 A | 7/1996 | Hilker et al. | |
| 5,565,498 A | 10/1996 | Chaffanjon et al. | |
| 5,594,039 A | 1/1997 | Gerber et al. | |
| 5,594,097 A | 1/1997 | Chaffanjon et al. | |
| 5,607,982 A | 3/1997 | Heyman et al. | |
| 5,618,854 A | 4/1997 | Skorpenske et al. | |
| 5,621,016 A | 4/1997 | Murty et al. | |
| 5,686,187 A | 11/1997 | Turnbach | |
| 5,686,526 A | 11/1997 | Turnbach | |
| 5,698,609 A | 12/1997 | Lockwood et al. | |
| 5,700,390 A | 12/1997 | Turnbach | |
| 5,700,869 A | 12/1997 | Turnbach | |
| 5,716,439 A | 2/1998 | Turnbach | |
| 5,877,227 A | 3/1999 | Murty | |
| 6,020,391 A | 2/2000 | Leenslag | |
| 6,063,825 A | 5/2000 | Isobe et al. | |

(Continued)

FOREIGN PATENT DOCUMENTS

| | | |
|---|---|---|
| EP | 0 257 441 A2 | 3/1988 |
| EP | 0547765 A1 | 6/1993 |
| EP | 0 608 626 A1 | 8/1994 |
| EP | 0 765 355 B1 | 4/1997 |
| EP | 1164153 A1 | 12/2001 |
| EP | 1174453 A1 | 1/2002 |
| EP | 1178061 A1 | 2/2002 |
| EP | 1234843 A1 | 8/2002 |
| EP | 1 471 086 A2 | 10/2004 |
| EP | 1 529 792 A1 | 5/2005 |
| EP | 1305352 B1 | 8/2005 |
| GB | 2 109 803 A | 6/1983 |
| GB | 2308373 A | 6/1997 |
| GB | 2 329 642 A | 3/1999 |
| JP | 59-166537 | 9/1984 |
| JP | 60-181115 | 9/1985 |

(Continued)

OTHER PUBLICATIONS

ASTM Designation: D 3574-05 "Standard Test Methods for Flexible Cellular Materials—Slab, Bonded, and Molded Urethane Foams," Copyright ASTM International, 100 Barr Harbor Drive, West Conshohocken, PA 19428-2959; Aug. 2005, pp. 1-25.

(Continued)

*Primary Examiner* — John Cooney
(74) *Attorney, Agent, or Firm* — Nelson Mullins Riley & Scarborough LLP

(57) ABSTRACT

A high resilience flexible polyurethane foam, made using methylene diphenyl diisocyanate (MDI), having a bulk foam density in the range of 2.5 pounds per cubic foot or lower and having a foam hardness or IFD in the range of 10 to 40 lb/50 $in^2$. The present invention is also directed to the method for the making thereof.

18 Claims, 1 Drawing Sheet

(56) References Cited

U.S. PATENT DOCUMENTS

| | | | |
|---|---|---|---|
| 6,080,800 A | 6/2000 | Frey et al. | |
| 6,096,237 A | 8/2000 | Narayan et al. | |
| 6,096,238 A | 8/2000 | Lutter et al. | |
| 6,133,481 A | 10/2000 | Singh et al. | |
| 6,136,878 A | 10/2000 | Free et al. | |
| 6,158,815 A | 12/2000 | Sugie et al. | |
| 6,180,686 B1 | 1/2001 | Kurth | |
| 6,201,035 B1 | 3/2001 | Tuinman et al. | |
| 6,239,186 B1 | 5/2001 | Mansfield et al. | |
| 6,245,825 B1 | 6/2001 | Bleys | |
| 6,316,514 B1 * | 11/2001 | Falke et al. | 521/174 |
| 6,352,658 B1 | 3/2002 | Chang et al. | |
| 6,372,812 B1 | 4/2002 | Niederoest et al. | |
| 6,376,698 B1 | 4/2002 | Bleys | |
| 6,417,241 B1 | 7/2002 | Huygens et al. | |
| 6,432,543 B2 | 8/2002 | Harrison et al. | |
| 6,457,777 B1 | 10/2002 | Kazuno et al. | |
| 6,465,569 B1 | 10/2002 | Kurth | |
| 6,521,674 B1 | 2/2003 | Haley et al. | |
| 6,579,912 B2 | 6/2003 | Parfondry et al. | |
| 6,583,192 B2 | 6/2003 | Falke et al. | |
| 6,586,486 B2 | 7/2003 | Falke et al. | |
| 6,590,008 B1 | 7/2003 | Parfondry et al. | |
| 6,593,387 B2 | 7/2003 | Parfondry et al. | |
| 6,617,369 B2 | 9/2003 | Parfondry et al. | |
| 6,649,107 B2 | 11/2003 | Harrison et al. | |
| 6,660,783 B2 | 12/2003 | Arlt et al. | |
| 6,734,220 B2 | 5/2004 | Niederoest et al. | |
| 6,747,068 B2 | 6/2004 | Kelly | |
| 6,759,448 B2 | 7/2004 | Toyota et al. | |
| 6,765,034 B2 | 7/2004 | Nishida et al. | |
| 6,774,153 B2 | 8/2004 | Parfondry et al. | |
| 6,784,217 B2 | 8/2004 | Parfondry et al. | |
| 6,784,218 B1 | 8/2004 | Apichatachutapan et al. | |
| 6,797,736 B1 | 9/2004 | Smiecinski et al. | |
| 6,852,403 B2 | 2/2005 | Harrison et al. | |
| 6,855,742 B2 | 2/2005 | Hager et al. | |
| 6,858,655 B1 | 2/2005 | Hofmann et al. | |
| 6,864,296 B2 | 3/2005 | Kurth | |
| 6,867,239 B2 | 3/2005 | Kurth | |
| 6,881,763 B2 | 4/2005 | Kurth | |
| 6,884,825 B2 | 4/2005 | Daunch et al. | |
| 6,919,384 B2 | 7/2005 | Yu | |
| 7,169,824 B2 | 1/2007 | Bleys et al. | |
| 7,238,730 B2 | 7/2007 | Apichatachutapan et al. | |
| 7,268,170 B2 | 9/2007 | Anderson et al. | |
| 7,456,229 B2 | 11/2008 | Hager et al. | |
| 8,058,343 B2 | 11/2011 | Liu et al. | |
| 8,097,675 B2 | 1/2012 | Finder et al. | |
| 2002/0058774 A1 | 5/2002 | Kurth et al. | |
| 2003/0060528 A1 | 3/2003 | Parfondry et al. | |
| 2003/0087977 A1 | 5/2003 | Parfondry et al. | |
| 2003/0105178 A1 | 6/2003 | Kurth | |
| 2003/0143910 A1 | 7/2003 | Mashburn et al. | |
| 2003/0158280 A1 | 8/2003 | Daunch et al. | |
| 2003/0212155 A1 | 11/2003 | Parfondry et al. | |
| 2004/0029988 A1 | 2/2004 | Kurth | |
| 2004/0034163 A1 | 2/2004 | Kurth | |
| 2004/0102596 A1 | 5/2004 | Kurth | |
| 2004/0147627 A1 | 7/2004 | Hager et al. | |
| 2004/0152796 A1 | 8/2004 | Muller et al. | |
| 2004/0162385 A1 | 8/2004 | Krebs | |
| 2004/0186192 A1 | 9/2004 | Smiecinski et al. | |
| 2004/0254256 A1 | 12/2004 | Lockwood et al. | |
| 2004/0259968 A1 | 12/2004 | Krebs | |
| 2005/0032973 A1 | 2/2005 | Krebs et al. | |
| 2005/0070620 A1 | 3/2005 | Herrington et al. | |
| 2005/0101681 A1 | 5/2005 | Kaushiva et al. | |
| 2005/0176840 A1 | 8/2005 | Chan et al. | |
| 2005/0182228 A1 | 8/2005 | Kurth | |
| 2005/0222291 A1 | 10/2005 | Pirkl et al. | |
| 2006/0060486 A1 | 3/2006 | Castleberry | |
| 2006/0073321 A1 | 4/2006 | Kaushiva et al. | |
| 2006/0084710 A1 | 4/2006 | Meyer-Ahrens et al. | |
| 2006/0128928 A1 | 6/2006 | Wershofen et al. | |
| 2006/0142529 A1 | 6/2006 | Tiede et al. | |
| 2007/0155941 A1 | 7/2007 | Nefzger et al. | |
| 2007/0282028 A1 | 12/2007 | Harre et al. | |
| 2007/0293594 A1 | 12/2007 | Heisler et al. | |
| 2010/0160470 A1 | 6/2010 | Smiecinski et al. | |
| 2010/0160473 A1 | 6/2010 | Neff et al. | |
| 2010/0249260 A1 * | 9/2010 | Casati et al. | 521/170 |

FOREIGN PATENT DOCUMENTS

| | | |
|---|---|---|
| JP | 1-104611 | 4/1989 |
| JP | 3-45618 | 2/1991 |
| JP | 7-3062 | 1/1995 |
| JP | 11-171963 | 6/1999 |
| JP | 2003-342343 | 12/2003 |
| JP | 2006-45267 | 2/2006 |
| WO | 94/24183 | 10/1994 |
| WO | 95/34591 | 12/1995 |
| WO | 96/06874 | 3/1996 |
| WO | WO 00/08083 A1 | 2/2000 |
| WO | 0015684 A1 | 3/2000 |
| WO | WO 00/55232 A1 | 9/2000 |
| WO | 0073368 A1 | 12/2000 |
| WO | WO 00/73362 A2 | 12/2000 |
| WO | WO 00/73363 A1 | 12/2000 |
| WO | WO 01/07521 A1 | 2/2001 |
| WO | WO 01/32735 A1 | 5/2001 |
| WO | WO 01/32736 A1 | 5/2001 |
| WO | WO 01/60884 A1 | 8/2001 |
| WO | WO 02/10245 A1 | 2/2002 |
| WO | WO 02/10246 A1 | 2/2002 |
| WO | WO 02/059175 A2 | 8/2002 |
| WO | 2004011518 A2 | 2/2004 |
| WO | WO 2004/014976 A1 | 2/2004 |
| WO | WO 2004/014980 A1 | 2/2004 |
| WO | 2004071281 A2 | 8/2004 |
| WO | 2004096883 A1 | 11/2004 |
| WO | WO 2005/003205 A1 | 1/2005 |
| WO | 2006116456 A1 | 11/2006 |
| WO | 2007/042407 A1 | 4/2007 |
| WO | WO 2011/106377 A1 | 9/2011 |

OTHER PUBLICATIONS

Article, "A New Era for MDI:Flexible Polyurethane Slabstock Foam," Knaub et al. Journal of Cellular Plastics, vol. 33—Mar. 1997, pp. 159-184.

Technical Bulletin 117, "Requirements, Test Procedure and Apparatus for Testing the Flame Retardance of Resilient Filling Materials Used in Upholstered Furniture," State of California Department of Consumer Affairs, Bureau of Home Furnishings and Thermal Insulation, 3485 Orange Grove Avenue, North Highlands, CA 95660, Mar. 2000, pp. 1-8.

U.S. Appl. No. 12/701,356, filed 2010, Dounis.

European Patent Office International Search Report for WO2011/106377, (2011).

Publication: Smiecinski et al., BASF Corp., Michigan, "Visco-Elastic Polyurethane Foam: The Impact of Isocyanate Upon Foam Morphology", Sep. 26, 2006, p. 405-416.

* cited by examiner

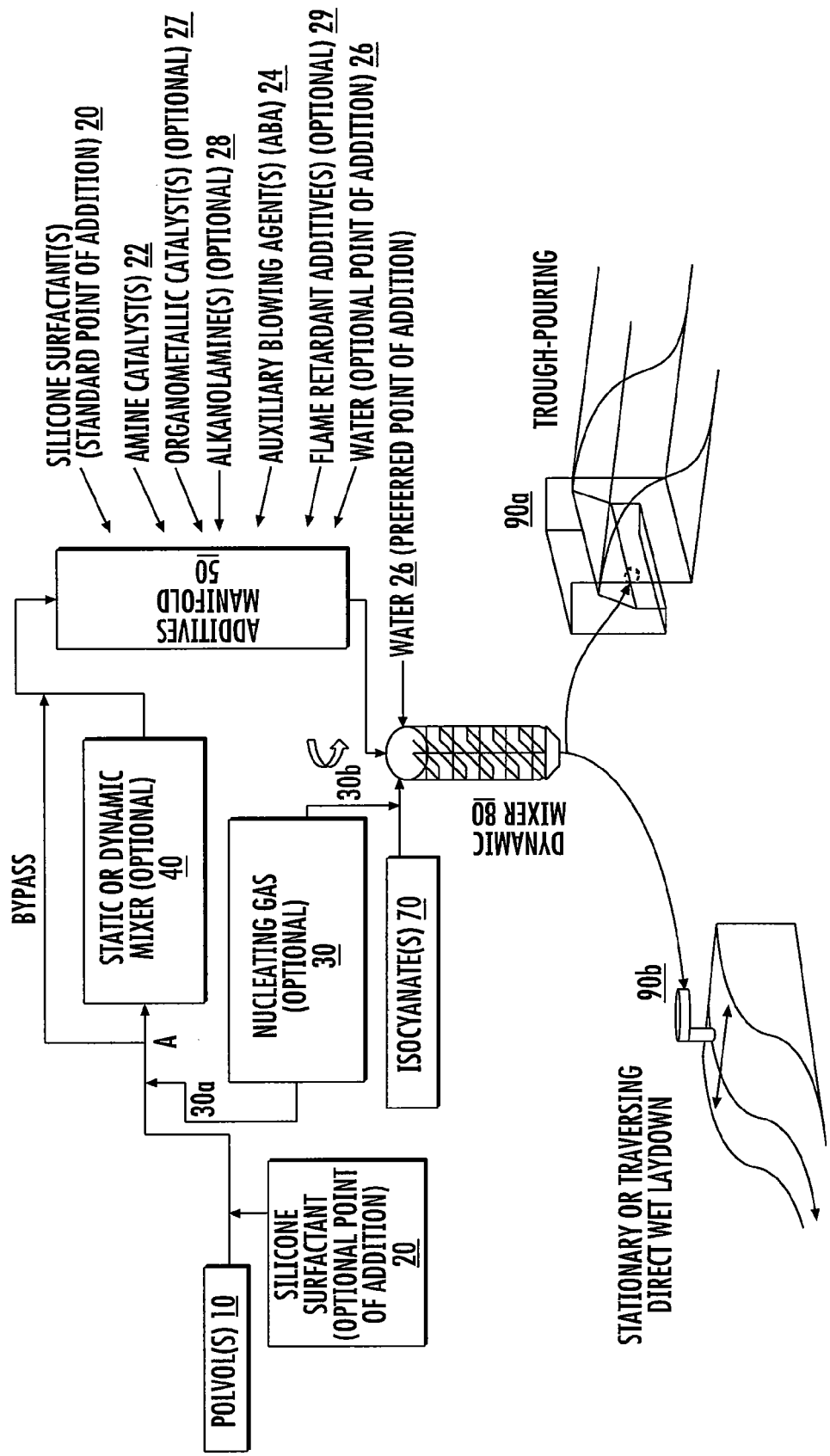

HIGH RESILIENCE FLEXIBLE POLYURETHANE FOAM USING MDI

CROSS-REFERENCE TO RELATED APPLICATIONS

This application claims priority from U.S. patent application Ser. No. 61/203,168 filed on Dec. 19, 2008. The disclosure of which is incorporated herein by reference.

FIELD OF THE INVENTION

The present invention relates to a high resilience flexible polyurethane foam using methylene diphenyl diisocyanate (MDI), including a high resilience flexible slabstock polyurethane foam made using MDI, its formulation, and the process for the making thereof.

BACKGROUND OF THE INVENTION

Flexible slabstock polyurethane foam for furniture and bedding has traditionally been produced using toluene diisocyanate (TDI) as a basic raw material.

In the United States, methylene diphenyl diisocyanate (MDI) has predominantly been used in polyurethane foam applications other than flexible slabstock polyurethane foam applications such as furniture and bedding. MDI has been used in, for example, molded polyurethane foam such as automotive applications; rigid polyurethane foam such as insulation, construction and packaging; microcellular froth polyurethane foam such as footwear and gasketing; and viscoelastic ("memory") polyurethane foam chemistries. Due in part to the inherently different chemical reaction kinetics as well as the differences in foam stabilization requirements for processing using MDI as opposed to TDI, MDI does not readily fit the criteria for use in continuous flexible slabstock foam formulations. In Europe, MDI has been utilized to produce high density, namely greater than 2.5 pounds per cubic foot (PCF) high resilience slabstock foams. In general terms, the complexity of formulation, speed of reactivity and mechanical processing limitations have prevented the commercialization of low density, soft MDI-based foams since the advent of the flexible polyurethane foam industry in the 1950s.

In the wake of Hurricane Katrina in the United States, many of the necessary flexible polyurethane foam raw materials became temporarily but seriously unavailable due to unplanned chemical plant shutdowns and transportation problems. More recently, a similar situation with TDI specifically, due to global demand exceeding current supply, resulted in allocated supply and significant price increases.

The cost of polyurethane foam, whether TDI or MDI based, is driven almost solely by chemical cost. Lower density foams cost less per unit than higher density foams, making them more attractive to end users, given acceptable performance. In the United States market, where foam is considered commodity-like, due to similarity of product and aggressive pricing, high-density European-style MDI foams have never widely gained acceptance.

Thus, there is a need to reduce dependence on potentially scarce raw materials to produce a MDI-based high resilience flexible polyurethane foam, more particularly one that is acceptable to the particular needs of the furniture, bedding and other industries. Accordingly, there is a need for an alternative high resilience flexible slabstock polyurethane foam.

SUMMARY OF THE INVENTION

The present invention is directed to a high resilience flexible polyurethane foam, made using methylene diphenyl diisocyanate (MDI), having a bulk foam density of 2.5 pounds per cubic foot or lower and having a foam hardness or Indentation Force Deflection (IFD) in a range of 10 to 40 lb/50 in$^2$.

In an aspect of the present invention, the high resilience flexible polyurethane foam having a bulk foam density of 2.5 pounds per cubic foot or lower and having a foam hardness or Indentation Force Deflection (IFD) in a range of 10 to 40 lb/50 in$^2$ is measured in accordance with test method ASTM 3574—Test $B_1$.

In another aspect of the present invention, the high resilience flexible polyurethane foam passes the requirements of State of California Technical Bulletin 117 without the use of a flame retardant additive.

It is also a feature of the foam of the present invention that the foam is made without or substantially free of toluene diisocyanate (TDI).

The present invention is also directed to a method of making a high resilience flexible polyurethane foam. The method comprises reacting methylene diphenyl diisocyanate (MDI) with a high resilience polyol in the presence of a blowing agent.

In an another aspect of the method of the present invention, the foam is made without or substantially free of toluene diisocyanate (TDI).

In still yet another aspect of the method of the present invention, the method of making a high resilience flexible polyurethane foam comprises reacting a high resilience polyol with methylene diphenyl diisocyanate (MDI) in the presence of a blowing agent in a one-shot continuous process.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, not necessarily to scale, wherein:

FIG. 1 is a process flow diagram illustrating a method of making a high resilience flexible slabstock polyurethane foam using MDI in accordance with the present invention.

DETAILED DESCRIPTION OF THE INVENTION

The following detailed description of the embodiment(s) is merely exemplary in nature and is in no way intended to limit the invention, its application, or uses.

The polyurethane foam of the present invention is of the high resilience flexible polyurethane foam type. High resilience foam typically has a cell structure that is less uniform, thus having a more randomly distributed cell size often described as a bimodal distribution, than conventional polyurethane foam products. The difference in cell structure provides additional support, comfort, and resilience. High resilience foams typically have a high support factor and a greater resilience than conventional polyurethane foams. Furthermore, the high resilience flexible polyurethane foam of the present invention is made using methylene diphenyl diisocyanate, also commonly referred to as diphenyl methane diisocyanate, (MDI).

Preferably, MDI is either pure MDI or in the form of a mixture including, but not limited to, any amount or ratio of isomers 4,4'-diphenylmethane diisocyanate, 2,4'-diphenylmethane diisocyanate, 2,2'-diphenylmethane diisocyanate and optionally blended with any polymeric, modified, or prepolymer MDI species. The isomers may be in any ratio or in any blend of these isomer polyisocyanates with a blend average isocyanate functionality of ≥2. Examples of commercially available MDI products pertaining to the description above include, but are not limited to: No. 280 Isocyanate, No. 278 Isocyanate—BASF Corp.; MONDUR® 1488—Bayer Material Science LLC; PAPI® 20, PAPI® 27, PAPI® 94, PAPI® 95, PAPI® 580N, PAPI® 901—DOW Chemical Co.; SUPRASEC® 5005, SUPRASEC® 6521, SUPRASEC® 6522, SUPRASEC® 9597, SUPRASEC® 7050—Huntsman Petrochemical Corporation.

Thus, the high resilience flexible polyurethane foam made using MDI of the present invention serves as an alternative to the high resilience polyurethane foam made using toluene diisocyanate (TDI). TDI has become a relatively expensive foam ingredient of which the supply remains unstable. Thus, the high resilience flexible polyurethane foam of the present invention provides the potential to introduce a new flexible polyurethane foam with features unique to the application of MDI foam chemistry.

A high resilience flexible polyurethane foam to be useful for furniture and bedding is required in its industry to have a bulk foam density in the range of 2.5 pounds per cubic foot (PCF) or lower, more preferably ≤1.8 PCF, and a foam hardness or Indentation Force Deflection (IFD) in the range of 10 to 40 lb/50 in$^2$, as measured in accordance with ASTM 3574.

As indicated previously, MDI, however, does not lend itself to achieve products in this density range and until the present invention has prevented products in the desired IFD range. However, in the method of the present invention, MDI is used to make a high resilience foam wherein both the desired foam density and the desired foam hardness are achieved independently of one another. Furthermore, the high resilience flexible polyurethane foam of the present invention is achieved without or substantially free of TDI. The high resilience flexible polyurethane foam of the present invention is achieved with or without the use of load-bearing (support-enhancing) polyols including, but not limited to, copolymer polyol, polymer polyol, graft polyol, PIPA polyol, crosslinker, and polyharnstoff dispersion (PHD) polyol, and a combination thereof, which have been historically required to impart high resilience flexible foam physical properties and performance.

The present invention relates to a process for preparing a high resilience flexible slabstock polyurethane foam. In particular, the present invention relates to a process for preparing a high resilience flexible slabstock polyurethane foam using MDI to achieve a foam with a density in a range of 2.5 pounds per cubic foot (PCF) or lower, more preferably ≤1.8 PCF, as measured in accordance with ASTM 3574.

Referring now to the Figures, FIG. 1 illustrates a method of making a high resilience flexible slabstock polyurethane foam made using MDI. FIG. 1 illustrates a one-shot continuous manufacturing process in which the reactive and non-reactive foam ingredients are mixed in one continuous step.

As shown in FIG. 1, one or more polyols 10 as described in Table 1, including at least a high resilience polyether polyol, are fed to an additives manifold 50.

TABLE 1

| Polyols | Molecular Weight Range (g/mol) | Ethylene oxide (EO) Range (%) | Propylene oxide (PO) Range (%) | Solids Range (%) |
|---|---|---|---|---|
| Type | | | | |
| Conventional | 3000-3900 | 0-15 | 85-100 | 0 |
| High Resilience | 4500-6000 | 12-20 | 80-88 | 0 |
| Graft | 1500-8500 | 0-20 | 80-100 | 1-75 |

With reference to the high resilience polyether polyol, the polyol is a polyalkyleneoxide polyether glycol having a molecular weight in a range from about 4,500 to 6,000 g/mol with the weight percent content of ethylene oxide groups being from about 12 to 20 weight percent of the total alkylene oxide group content (therefore, the remaining 80 to 88 weight percent of the total alkylene oxide groups being propylene oxide groups) while having a hydroxyl functionality ranging from about 2 to 8, preferably from about 2 to 3. Examples of commercialized high resilience slabstock foam polyols include, but are not limited to, PLURACOL® P-945, P-2090, P-2100, P-2115, P-2120, P-2130—BASF Corp., VORANOL® 3512A and VORANOL® 4701—Dow Chemical Co.

Referring to the conventional polyether polyol, the polyol has a molecular weight in a range from about 3,000 to 3,900 g/mol with the weight percent content of ethylene oxide groups being from about zero to 15 percent of the total alkylene oxide group content (therefore, the remaining 85 to 100 weight percent of the total alkylene oxide groups being propylene oxide groups) while having a hydroxyl functionality ranging from about 2 to 8, preferably from about 2 to 3. Examples of commercially available conventional slabstock polyether polyols include, but are not limited to, PLURACOL® P-1385, P-1388, P-4150 and P-4156—BASF Corp., ARCOL® F-3022, ACCLAIM® F-3040, ACCLAIM® 3300N—Bayer Corp., VORANOL® 3136 and VORANOL® 3137—Dow Chemical Co. The present invention uses a high resilience polyether polyol with or without the use of a conventional polyether polyol, preferably without the use of a conventional polyether polyol.

Referring to the graft polyol, the polyol has a molecular weight in a range from about 1,500 to 8,500 g/mol and a solids level ranging up to about 75 percent by weight of the graft polyol as realized through chain growth copolymer polyol chemistry such as wherein the free-radical polymerization of styrene and acrylonitrile copolymerized with a polyol itself to produce a grafted polyol of the SAN type, or through step-growth polyol polymerization chemistry such as wherein polyurea particles resulting from the reaction of diamines with diisocyanate in the presence of polyol thereby being dispersed in polyol, or through PIPA polyol chemistry such as wherein an alkanolamine has been reacted with a diisocyanate in the presence of a polyol to produce a dispersion of polyurethane particles in polyol. Examples of commercialized graft polyols, polymer polyols or copolymer polyols include, but are not limited to, PLURACOL® P-637, P-1365, P-1441, P-1442, P-1443, P-1543, P-4600, P-4800, P-4815, P-4830, P-4850—BASF Corp., ARCOL® E-919, ARCOL® HS-100 and ULTRACELL® U-3000—Bayer Corp., VORANOL® 3943A—Dow Chemical Co. The present invention uses a high resilience polyether polyol with or without the use of a graft polyol, preferably without a graft polyol.

In accordance with the present invention, these polyols may have either randomly distributed ethylene oxide and propylene oxide groups or may be of the blocked type of polymer polyol wherein the ethylene oxide and propylene oxide is sequentially incorporated into the polyol structure. These polyols may also be either primary or secondary hydroxyl group terminated.

In the process of the present invention, the polyol or polyols optionally pass through a static or dynamic mixer 40 before reaching the additives manifold 50 and, if after having passed through the mixer 40, proceeds to the additives manifold 50. Alternatively, the polyol(s) 10 may bypass the static or dynamic mixer 40 and is fed to the additives manifold 50. Prior to the junction A at which the polyol(s) 10 either bypasses the mixer 40 or enters the mixer 40, a silicone surfactant 20 may be optionally added. Another optional addition to the polyol 10 prior to arriving at the junction is the optional addition of a nucleating gas 30 such as nitrogen or air in feed stream 30a.

At the additives manifold 50, several components are continuously fed and mixed. One or more silicone surfactants 20 are added. The additives manifold 50 is the standard point of addition for the silicone surfactant(s) 20. Amine catalyst(s) 22 is also added at this point in the process. An auxiliary blowing agent (ABA) 24 is added. Water 26 is optionally added at the additives manifold 50, although water is preferably added later at the dynamic mixer 80. Other chemical components that are optionally added at the additives manifold 50 include, but are not limited to, an organometallic catalyst 27, alkanolamine(s) 28, and a flame retardant additive(s) 29. Examples of suitable polyurethane foam flame retardants include, but are not limited to, halogen-containing phosphate esters such as brominated or chlorinated phosphate esters, chlorinated paraffins, melamine powders or phosphorous flame retardant compounds. Examples of such commercially available flame retardants for use in the present invention include, but are not limited to: AB-117HF—Albermarle Corp.; DE-60E-Special and FIREMASTER® 500, 550, and 600—Chemtura Corp.; CP-2—Gulbrandsen Chemicals; FR-2, FR-38, HF-4—ICL, Limited; DISFLAMOLL® DPK—Lanxess Corp. Although a flame retardant may be optionally added, Applicant has surprisingly found that high resilience flexible foam of the present invention does not require the use of a flame retardant chemical additive to satisfy the requirements of the State of California's Technical Bulletin 117 for "Requirements, Test Procedure and Apparatus for Testing the Flame Retardance of Resilient Filling Materials Used in Upholstered Furniture," which is the standard in the furniture industry.

All components fed in and added at the additives manifold 50 are next fed to the dynamic mixer 80. Additional nucleating gas 30 (such as, but not limited to, nitrogen or air) is optionally fed in feed stream 30b to the feed stream of isocyanate 70 prior to entering the main dynamic mixer 80. At the main dynamic mixer 80 is also the preferred point of addition for water 26. It is at this point in the process, wherein the foaming reaction begins to take place as the isocyanate begins to simultaneously react with both the polyol(s) and the water in this foam formulation.

There are at least two dispensing methods suitable for use in the present invention for dispensing the mixed stream from the main dynamic mixer 80, namely trough-pouring 90a or, stationary or traversing direct wet laydown 90b.

In accordance with the method of the present invention, high resilience polyether polyol(s) are reacted with isocyanate in the presence of water in the range from about 0.1 to 8.0 based on parts per hundred polyol (pphp), preferably about 2.5 to 5.0 pphp. The reaction of the polyol(s) with the isocyanate proceeds to form polyurethane, considered to compose the primary soft-segment portion of the final skeletal framework of the foam. Simultaneously, the water reacts to form polyurea considered to compose the hard-segment portion of the foam's final skeletal framework while also liberating carbon dioxide as a bi-product gas. It is this evolution of the carbon dioxide gas via the reaction of water and isocyanate which thereby "blows" the foam hence expanding it into a cellular structure. Therefore, water serves also in this chemistry as the primary blowing agent. In addition to water being the primary blowing agent, an auxiliary blowing agent is added in the range of from 0 to 20 pphp, more preferably from about 2 to 10 pphp. Suitable auxiliary blowing agents include, but are not limited to, acetone, pentane, methylene chloride, methyl-formate, water, and $CO_2$. A preferred auxiliary blowing agent is acetone. Such auxiliary blowing agent is commercially available from Sasol Chemicals North America LLC.

In accordance with the present invention, a silicone surfactant is added in the range from about 0.01 to 5.0 pphp, preferably from about 0.1 to 1.0 pphp. These surfactants include, but are not limited to, unmodified polydimethylsiloxane polymers, modified polydimethylsiloxane copolymers such as of the polyalkyleneoxide polydimethylsiloxane copolymer type, and a combination thereof. Examples of suitable surfactants for use in the present invention include, but are not limited to, high resilience surfactants, high resilience molded surfactants and high resilience slabstock foam surfactants. Examples of commercially available products include, but are not limited to: DABCO® DC-5043—Air Products & Chemicals Inc; TEGOSTAB® B-4113, B-4690, B-8636, B-8681, B-8715LF, B-8716LF, —Evonik Industries; NIAX® U-2000, L-3001, L-3002, L-3184—Momentive Performance Materials.

The balance of these components, along with a use of a catalyst(s), produces a foam product made using MDI that is suitable for furniture and bedding applications. Examples of suitable catalysts for use in the present invention, include but are not limited to, tertiary amine catalysts and organometallic catalysts. Preferred catalysts are amine catalysts and tin catalysts. Examples of commercially available amine catalysts include, but are not limited to: bis-Dimethylaminoethylether amine blends known as DABCO BL-13—Air Products & Chemicals Inc., JEFFCAT® ZF-24—Huntsman Petrochemical Corp. and Niax A-133—Momentive Performance Materials; dibutylaminoethanol (DBAE); dimethylethanolamine (DMEA); 1,2-Dimethylimidazole amine blends known as DM-70—Tosoh USA Inc., DABCO® 2039—Air Products & Chemicals Inc.; tributylamine (TBA); triethylenediamine (TEDA) blend known as TEGOAMIN® 33—Evonik Industries, DABCO® 33LV—Air Products & Chemicals Inc., Niax® A-33—Momentive Performance Materials. Examples of commercially available polyurethane foam tin catalysts include, but are not limited to: stannous octoate blends known as Kosmos 29—Evonik Industries, DABCO® T-9—Air Products & Chemicals Inc.; dibutyltin dilaurate blends known as DABCO® T-12—Air Products & Chemicals Inc., Kosmos 19—Evonik Industries.

In accordance with the present invention, alkanolamines may optionally be added in a range of from about 0 to 5 pphp, preferably from about 0 to 3 pphp in order to catalytically balance the stability of the foam while rising or expanding. Suitable alkanolamines include, but are not limited to, diethanolamine (DEOA). An example of a commercially available DEOA is DABCO® DEOA-LF, an 85% diethanolamine solution in 15% water, Air Products & Chemicals Inc.

A measure of the stoichiometry between the reactive ingredients of the foam hardness is referred to as the formulation index. The amount of isocyanate used relative to the theoretical equivalent amount is known as the Isocyanate Index:

$$\text{Isocyanate Index} = \frac{\text{Actual amount of isocyanate used}}{\text{Theoretical amount of isocyanate required}} \times 100$$

As known to those skilled in the art, the Isocyanate Index is one of several methods, but a key method, for affecting the foam's hardness or Indentation Force Deflection (IFD) for the desired application.

The MDI index for the foam of the present invention is maintained in the range of 70 to 130, preferably 90 to 110. The process comprises reacting, at an isocyanate index of 70 to 130, the following components: MDI, polyether polyol(s) as set forth in Table 1, a catalyst(s), a surfactant(s) and water.

Unlike known processes for making high resilience polyurethane foams, the high resilience flexible slabstock polyurethane foam of the present invention made using MDI is made with or without a graft polyol. Representative molecular weight ranges, relative compositional weight percent ranges for the ratio of ethylene oxide to propylene oxide, and solids content (as it pertains to graft polyols) for the various types of polyol are set forth in Table 1.

Other additives and chemical components which are not necessary to the present invention but may optionally be used include, but are not limited to, flame retardant chemical additives, cross-linking agents, chain-extending agents, melamine, fillers, pigments, dyes, antimicrobials (biocides), antioxidants and the like.

An advantage of the foam of the present invention to the furniture and bedding industry is that it should bridge the technological gap that has prevented the widespread production of MDI slabstock foam in the United States and throughout the world by enabling lower density high resilience flexible foams across a wide range of hardness.

EXAMPLES

Several examples were conducted to make laboratory "bench" foams. Each sample's components (wherein the proportions and exact amounts for which being based on the total amount of polyol being used, 100 pphp, and as set forth in Table 2) were combined into a container as follows: a high resilience polyether polyol, diethanolamine, a polyurethane foam catalyst, flame retardant, silicone surfactant and acetone. These components were pre-mixed via a mixing-prop powered by a drill press at 2000 RPM's for 30 seconds. After this first 30 seconds of pre-mix, water was added to the pre-mix container with mixing continuing during the addition. Thereafter, five seconds after the water addition, the MDI was added to the mixing container (at which point the reactions between the MDI and both water and polyol simultaneously began) and mixing was continued for an additional 10 seconds after the MDI addition. Immediately following, the drill press/mixing was ceased and the mixture immediately poured into a square cardboard container wherein foam reaction kinetic data (via a thermocouple inserted in through the base of the box) and foam rise profile data (wherein the rate and extent of the foam rise was measured via a level detecting transducer affixed directly above the rising foam) were collected. Per each bench foam example, from the time at which the mixing cycle was completed a period of five minutes was realized during which time this data was collected, the foam reached a maximum height, carbon dioxide gas bubbles were observed to de-gas ("blow-off") at the top surface of the foam, and a maximum internal foam reaction temperature was observed and recorded. Thereafter, the bench foam was removed and placed into a curing oven for ten minutes at 150 degrees Fahrenheit. After having initially cured in the oven, the foam sample was removed from the oven and allowed to further cure at ambient room temperatures for twenty-four hours. At this point, the foam was cut and measured in accordance with industry standard ASTM D3574 for the properties listed as in Table 3.

TABLE 2

Example Formulations

| EXAMPLE ID | #1 | #2 | #3 | #4 | #5 | #6 | #7 | #8 |
|---|---|---|---|---|---|---|---|---|
| Polyol 1 (pphp) | 100.00 | 100.00 | 100.00 | 100.00 | 100.00 | 100.00 | 75.00 | 100.00 |
| Polyol 2 (pphp) | | | | | | | 25.00 | |
| Mineral oil | | | | | | | 6.00 | |
| DEOA-LF (85%), (pphp) | 0.350 | 0.350 | 0.350 | 0.350 | 0.350 | 0.450 | | 1.000 |
| WATER (pphp) | 3.57 | 3.57 | 3.57 | 3.55 | 3.55 | 3.55 | 3.52 | 3.82 |
| Catalyst 1 (pphp) | 0.110 | 0.110 | 0.110 | 0.130 | 0.130 | 0.130 | 0.033 | |
| Catalyst 2 (pphp) | 0.710 | 0.710 | 0.710 | 0.710 | 0.710 | | | 0.713 |
| Catalyst 3 (pphp) | | | | | | 0.994 | | |
| Catalyst 4 (pphp) | | | | | | | 0.770 | |
| Catalyst 5 (pphp) | | | | | | | | 0.200 |
| Catalyst 6 (pphp) | | | | | | | | 0.100 |
| Silicone surfactant 1 (pphp) | 0.500 | 0.700 | 0.700 | 0.750 | 0.750 | 0.750 | | 0.500 |
| Silicone surfactant 2 (pphp) | | | | | | | 1.000 | |
| FR Additive 1 (pphp) | | | | | 3.00 | 3.00 | | 11.50 |
| FR Additive 2 (pphp) | | | | 3.00 | | | | |
| FR Additive 3 (pphp) | | | | | | | | 6.00 |
| ACETONE (pphp) | 5.10 | 4.00 | 4.00 | 5.00 | 5.00 | 5.00 | 4.30 | 7.88 |
| MDI INDEX | 97.0 | 94.5 | 104.9 | 100.0 | 100.0 | 100.0 | 108.30 | 99.0 |
| MDI 1 | | | | | | | 63.50 | |
| MDI 2 | 59.87 | 58.29 | 64.74 | 61.43 | 61.43 | 61.81 | | |
| MDI 3 | | | | | | | | 72.42 |

Notes to Table 2:

Polyol 1 is a 35 OH 4800 molecular weight EO-tipped HR polyether polyol

Polyol 2 is a 56 OH 3000 molecular weight polyether polyol

Catalyst 1 is a bis(dimethylaminoethel) ether amine blend in dipropylene glycol

Catalyst 2 is a 1,2-dimethylimidazole amine blend

Catalyst 3 is a 1,2-dimethylimidazole amine blend

Catalyst 4 is a stannous octoate blend

Catalyst 5 is a Dimethylethanolamine (DMEA)

Catalyst 6 is a Triethylene diamine (TEDA) blend in dipropylene glycol

Silicone 1 is an unmodified silicone surfactant blend in an organic ester

Silicone 2 is a modified silicone surfactant blend

Flame Retardant 1 is 2-propanol, 1,3 dichloro-, phosphate

Flame Retardant 2 is Halogenated aryl ester/Aromatic phosphate Blend

Flame Retardant 3 is melamine

MDI 1 is a MDI blend of Diphenylmethane-4-4'-diisocyanate and polymeric MDI having a NCO content of 33%

MDI 2 is a MDI blend of Diphenylmethane-4-4'-diisocyanate and Diphenylmethane diisocyanate isomers, and polymeric MDI having a NCO content of 32.3%

MDI 3 is a MDI blend of Diphenylmethane diisocyanate isomers with the reaction product of polyol with methylenediphenyl diisocyanate having a NCO content of 29.9%

TABLE 3

Physical Properties & Performance Data

| EXAMPLE ID | #1 | #2 | #3 | #4 | #5 | #6 | #7 | #8 |
|---|---|---|---|---|---|---|---|---|
| Density (PCF) | 1.65 | 1.74 | 1.79 | 1.79 | 1.84 | 1.94 | 2.13 | 1.77 |
| Air Flow (SCFM) | 5.5 | 4.0 | 4.3 | 5.2 | 5.0 | 4.0 | 2.0 | 5.2 |
| 25% IFD (lbs/50 sq. in.) | 19.3 | 24.5 | 30.7 | 23.1 | 29.5 | 37.4 | N/T | 37.00 |
| 65% IFD (lbs/50 sq. in.) | 40.6 | 48.7 | 60.6 | 45.3 | 58.3 | 73.7 | N/T | N/T |
| 25% Return (lbs/50 sq. in.) | 12.7 | 14.4 | 17.4 | 15.1 | 18.6 | 22.0 | N/T | N/T |
| Hysteresis (%) | 65.8 | 58.8 | 56.5 | 65.4 | 63.1 | 58.9 | N/T | N/T |
| Support Factor | 2.11 | 1.99 | 1.97 | 1.96 | 1.98 | 1.97 | N/T | N/T |

Several examples were also carried out on full scale production equipment in order to demonstrate utility on this level. Each sample's components and exact metered amounts as a ratio of the total polyol being used, 100 pphp are illustrated in Table 4. All the components were independently and simultaneously metered through a mixing head via the one-shot method and continuously poured as illustrated in FIG. 1 onto a conveyor. Each experiment was carried out for a period of time generating several linear feet of slabstock foam. The foam samples were allowed to cure at ambient room temperatures for twenty-four hours. At this point, the foam was cut and measured in accordance with industry standard ASTM D3574 for the properties listed in Table 5. IFD was measured pursuant to ASTM D3574—Test $B_1$.

TABLE 4

Example Formulations of Production Experiments

| EXAMPLE ID | #1 | #2 | #3 | #4 | #5 | #6 | #7 | #8 |
|---|---|---|---|---|---|---|---|---|
| Formulations | | | | | | | | |
| Polyol 1 (pphp) | 5.00 | 90.00 | 100.00 | 100.00 | 99.00 | 99.00 | 99.00 | 99.00 |
| Polyol 2 (pphp) | | | | | 1.00 | 1.00 | 1.00 | 1.00 |
| Polyol 3 (pphp) | 90.0 | | | | | | | |
| Polyol 4 (pphp) | 5.0 | | | | | | | |
| Polyol 5 (pphp) | | 10.00 | | | | | | |
| DEOA-LF (85%), (pphp) | 0.200 | 0.200 | 0.300 | 0.300 | 0.330 | 0.150 | 0.350 | 0.350 |
| WATER (pphp) | 3.85 | 3.52 | 3.65 | 3.45 | 3.20 | 3.20 | 3.31 | 3.35 |
| Catalyst 1 (pphp) | 0.210 | 0.210 | 0.210 | 0.20 | 0.210 | 0.210 | 0.210 | 0.210 |
| Catalyst 2 (pphp) | 0.550 | 0.500 | 0.522 | 0.480 | 0.512 | 0.520 | 0.650 | 0.650 |
| Silicone surfactant 1 (pphp) | 0.600 | 0.600 | 0.600 | 0.600 | 0.800 | 00.80 | 0.600 | 0.600 |
| Silicone surfactant 2 (pphp) | 0.100 | 0.100 | 0.100 | 0.050 | 0.100 | | 0.200 | 0.200 |
| FR Additive 1 (pphp) | 4.00 | 4.00 | 4.00 | 4.00 | 4.00 | 4.00 | 4.00 | 4.00 |
| FR Additive 2 (pphp) | 5.00 | 5.00 | 5.00 | 5.00 | | | | |
| ACETONE (pphp) | 3.00 | 3.00 | 3.00 | 3.00 | 4.60 | 3.00 | 5.00 | 5.00 |
| MDI INDEX | 102.0 | 102.0 | 97.0 | 102.0 | 99.5 | 103.0 | 97.5 | 94.0 |
| MDI 1 | 62.01 | 61.17 | 60.50 | 60.25 | 55.77 | 57.07 | 56.34 | 54.87 |
| Machine Conditions | | | | | | | | |
| *Ambient Pressure, in Hg | 30.41 | 30.45 | 30.32 | 30.34 | 30.21 | 30.19 | 29.97 | 29.91 |
| *Ambient Temperature, deg. F. | 78 | N/A | 64 | 67 | 87 | 88 | 91 | N/A |
| *Moisture Grains | 22.0 | 29.5 | 86.9 | 57.4 | 85.2 | 85.2 | 102.8 | 24.9 |
| Polyol Throughput, lb/min | 485 | 485 | 485 | 485 | 325 | 325 | 325 | 375 |
| Polyol Temperature, deg. F. | 90 | 89 | 90 | 102 | 75 | 76 | 75 | N/A |
| MDI Temperature, deg. F. | 89 | 89 | 93 | 101 | 81 | 82 | 79 | N/A |
| Run time, min | 2.9 | 2.3 | 2.1 | 5.6 | 6.8 | 4.5 | 4.1 | 3.9 |

*These conditions indicate the conditions within the foaming tunnel

Notes to Table 4:

Polyol 1 is a 35 OH 4800 molecular weight EO-tipped HR polyether polyol

Polyol 2 is a 56 OH 3000 molecular weight polyether polyol

Polyol 3 is a 28 OH 6000 molecular weight EO-tipped HR polyether polyol

Polyol 4 is 37 OH 3000 molecular weight polyether polyether polyol

Polyol 5 is 28 OH 3000 molecular weight graft polyether polyol with 40% SAN solids Catalyst 1 is a bis(dimethylaminoethel) ether amine blend in dipropylene glycol Catalyst 2 is a 1,2-dimethylimidazole amine blend Silicone 1 is an unmodified silicone surfactant blend in an organic ester Silicone 2 is a modified silicone surfactant blend Flame Retardant 1 is 2-propanol, 1,3 dichloro-, phosphate Flame Retardant 2 is melamine MDI 1 is a MDI blend of Diphenylmethane-4-4'-diisocyanate and Diphenylmethane diisocyanate isomers, and polymeric MDI having a NCO content of 32.3%

TABLE 5

| | Physical Properties of Production Experiments | | | | | | | |
|---|---|---|---|---|---|---|---|---|
| EXAMPLE ID | #1 | #2 | #3 | #4 | #5 | #6 | #7 | #8 |
| Density (PCF) | 1.69 | 1.94 | 1.83 | 1.96 | 1.89 | 1.96 | 1.56 | 1.76 |
| Air Flow (SCFM) | 3.0 | 2.7 | 2.2 | 2.2 | 3.7 | 3.5 | 2.5 | 2.6 |
| 25% IFD (lbs/50 sq. in.) | 22.5 | 32.2 | 25.8 | 29.5 | 26.3 | 27.2 | 16.8 | 23.6 |
| Hysteresis (%) | 69.4 | 68.4 | 71.0 | 73.2 | 73.7 | 74.2 | 69.5 | 72.4 |
| Support Factor | 2.46 | 2.50 | 2.48 | 2.48 | 2.39 | 2.41 | 2.37 | 2.28 |

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A high resilience flexible polyurethane foam having a bulk foam density of 2.5 pounds per cubic foot or lower and having a foam hardness or 25% Indentation Force Deflection (IFD) in a range of 10 to 40 lb/50 in$^2$, wherein the foam results from a reaction of a polyalkyleneoxide polyether glycol polyol having a molecular weight in a range of from about 4,500 to 6,000 g/mol and water with methylene diphenyl diisocyanate (MDI) in the presence of at least a 1,2-dimethylimidazole amine catalyst, a silicone surfactant, and an auxiliary blowing agent and without a tin catalyst and without toluene diisocyanate (TDI), and wherein the foam made without the use of a flame retardant additive passes the requirements of State of California Technical Bulletin 117.

2. The high resilience flexible polyurethane foam according to claim 1, wherein the foam hardness or 25% IFD is measured in accordance with test method ASTM 3574—Test B$_1$.

3. The high resilience flexible polyurethane foam according to claim 1, wherein the bulk foam density is 1.8 pounds per cubic foot or lower.

4. The high resilience flexible polyurethane foam according to claim 1, wherein the MDI is pure or comprises a mixture of isomers.

5. The high resilience flexible polyurethane foam according to claim 4, wherein the mixture is in any amount or in any ratio of isomers selected from the group consisting of 4,4'-diphenylmethane diisocyanate, 2,4'-diphenylmethane diisocyanate, 2,2'-diphenylmethane diisocyanate, and a combination thereof.

6. The high resilience flexible polyurethane foam according to claim 4, wherein the mixture is blended with a polymeric, modified, or prepolymer MDI species.

7. The high resilience flexible polyurethane foam according to claim 4, wherein the isomers have a blend average isocyanate functionality of ≥2.

8. The high resilience flexible polyurethane foam according to claim 1, wherein the foam has an isocyanate index or stoichiometric amount in a range of 70 to 130.

9. The high resilience flexible polyurethane foam according to claim 8, wherein the foam has an isocyanate index or stoichiometric amount in a range of 90 to 110.

10. The high resilience flexible polyurethane foam according to claim 1, wherein the foam is made using a high resilience polyether polyol.

11. The high resilience flexible polyurethane foam according to claim 1, wherein the foam is made without a polyalkyleneoxide polyether polyol of less than about 4000 g/mol molecular weight.

12. The high resilience flexible polyurethane foam according to claim 1, wherein the foam is made without a graft polyol, copolymer polyol, polymer polyol, PIPA polyol, crosslinker, polyharnstoff dispersion (PHD) polyol, or any combination thereof.

13. The high resilience flexible polyurethane foam according to claim 1, wherein the polyol is a polyalkyleneoxide polyether glycol polyol having a molecular weight in a range of from about 4,500 to 6,000 g/mol with a weight percent content of ethylene oxide groups content being from about 12 to 20 weight percent of total alkylene oxide group content while having a hydroxyl functionality ranging from about 2 to 8.

14. The high resilience flexible polyurethane foam according to claim 13, wherein the polyol is a polyalkyleneoxide polyether glycol polyol having a molecular weight in a range of from about 4,500 to 6,000 g/mol with a weight percent content of ethylene oxide groups content being from about 12 to 20 weight percent of total alkylene oxide group content while having a hydroxyl functionality ranging from about 2 to 3.

15. The high resilience flexible polyurethane foam according to claim 1, wherein the polyol is a polyalkyleneoxide polyether glycol polyol having a molecular weight in a range of from about 4,500 to 6,000 g/mol with 80 to 88 weight percent of total alkylene oxide groups being propylene oxide groups while having a hydroxyl functionality ranging from about 2 to 8.

16. The high resilience flexible polyurethane foam according to claim 1, wherein the foam is made with or without a load-bearing or support-enhancing polyol selected from the group consisting of copolymer polyol, polymer polyol, graft polyol, PIPA polyol, crosslinker, polyharnstoff dispersion (PHD) polyol, and any combination thereof.

17. The high resilience flexible polyurethane foam according to claim 1, the foam comprises an additive selected from the group consisting of a flame retardant, a cross-linking agent, a chain-extending agent, melamine, a filler, a pigment, a dye, an antimicrobial, a biocide, an antioxidant, and a combination thereof.

18. A high resilience flexible polyurethane foam having a bulk foam density of 2.5 pounds per cubic foot or lower and having a foam hardness or 25% Indentation Force Deflection (IFD) in a range of 10 to 40 lb/50 in$^2$, wherein the foam results from a reaction of a polyalkyleneoxide polyether glycol polyol having a molecular weight in a range of from about 4,500 to 6,000 g/mol and a primary blowing agent of water with methylene diphenyl diisocyanate (MDI) in the presence of at least a 1,2-dimethylimidazole amine catalyst, a silicone surfactant, and an auxiliary blowing agent of acetone, and without a tin catalyst and without toluene diisocyanate (TDI), wherein acetone is in a range of 2 to 10 pphp, and wherein the foam made without the use of a flame retardant additive passes the requirements of State of California Technical Bulletin 117.

* * * * *